United States Patent [19]

Morrisey et al.

[11] Patent Number: 5,418,844
[45] Date of Patent: May 23, 1995

[54] AUTOMATIC ACCESS TO INFORMATION SERVICE PROVIDERS

[75] Inventors: James A. Morrisey, Gaithersburg, Md.; Von K. McConnell, Springfield; Charles H. Kennedy, Oakton, both of Va.; John C. Manning, Gaithersburg, Md.; Robert D. Farris, Sterling, Va.

[73] Assignee: Bell Atlantic Network Services, Inc., Arlington, Va.

[21] Appl. No.: 869,931
[22] Filed: Apr. 17, 1992
[51] Int. Cl.$^6$ .................................................. H04M 3/42
[52] U.S. Cl. ........................................ 379/207; 379/67; 379/210; 379/230; 379/216; 379/112
[58] Field of Search .............. 379/201, 207, 216, 93, 379/101, 115, 127, 45, 67, 230

[56] References Cited

U.S. PATENT DOCUMENTS

| | | | |
|---|---|---|---|
| 3,600,522 | 8/1971 | Benson | 379/216 X |
| 4,162,377 | 7/1979 | Mearns | 379/207 |
| 4,191,860 | 3/1980 | Weber | 379/115 |
| 4,313,035 | 1/1982 | Jordan et al. | 379/207 |
| 4,598,367 | 7/1986 | DeFrancesco et al. | 379/93 |
| 4,611,094 | 9/1986 | Asmuth et al. | 379/207 |
| 4,611,096 | 9/1986 | Asmuth et al. | 379/207 |
| 4,677,552 | 6/1987 | Sibley, Jr. | 379/93 |
| 4,756,020 | 7/1988 | Fodale | 379/112 |
| 4,757,267 | 7/1988 | Riskin | 379/113 |
| 4,763,191 | 8/1988 | Gordon et al. | 379/201 |
| 4,769,834 | 9/1988 | Billinger et al. | 379/112 |
| 4,788,718 | 11/1988 | McNabb et al. | 379/113 |
| 4,817,129 | 3/1989 | Riskin | 379/88 |
| 4,878,240 | 10/1989 | Lin et al. | 379/67 |
| 4,899,373 | 2/1990 | Lee et al. | 379/207 |
| 4,922,519 | 5/1990 | Daudelin | 379/112 |
| 4,926,471 | 5/1990 | Ikeda | 379/216 |
| 4,943,995 | 7/1990 | Daudelin et al. | 379/112 |
| 4,953,203 | 8/1990 | Shepard | 379/207 |
| 5,182,766 | 1/1993 | Garland | 379/201 X |
| 5,204,894 | 4/1993 | Darden | 379/213 X |
| 5,206,899 | 4/1993 | Gupta et al. | 379/120 |
| 5,222,120 | 6/1993 | McLeod et al. | 379/216 |
| 5,222,125 | 6/1993 | Creswell et al. | 379/112 |
| 5,259,026 | 11/1993 | Johnson | 379/216 X |
| 5,272,748 | 12/1993 | Davis | 379/216 X |

OTHER PUBLICATIONS

Berman et al., "Perspective on the AIN Architecture", Feb. 1992, IEEE Communications Magazine, pp. 27–32.

Haselton, "Service-Creation Environments for Intelligent Networks", IEEE Communications Magazine, Feb. 1992, pp. 78–81.

Jabbari, "Intelligent Network Concepts in Mobile Communications", IEEE Communications Magazine, Feb. 1992, pp. 64–69.

Kopeikin, "ISDN Proffessional Service", Electrical Communication, vol. 63, No. 4, 1989, pp. 366–373.

*Primary Examiner*—James L. Dwyer
*Assistant Examiner*—Daniel S. Hunter
*Attorney, Agent, or Firm*—Lowe, Price, LeBlanc & Becker

[57] ABSTRACT

A short dedicated code, such as an N11 telephone number, is used to access an information source selected from a large number of voice, data, facsimile and/or video services offered by information service providers. The system can use a single N11 number for all calls, or a first code number for preprogrammed call processing and a second number for casual access. The system can route an information service call based at least in part on preprogrammed selection data for the caller stored in a central data base, or can prompt a casual caller for various inputs to determine which service the caller currently wants to access. The disclosed system of call routing eliminates the need for information service users to know a large number of different telephone numbers to access a variety of information services. In the preferred embodiments, the user only needs to know one or two three-digit N11 type access numbers, such as 211 or 511. Because of the use of a programmable central data base, the system can provide customized routing and call processing procedures for different customers and for accessing different providers' services. Also, the system allows easy modification and updating of the stored data to suit a customer's current needs for accessing different information sources. The system can also provide access authorization procedures as defined by the customer or as defined by the information service provider.

4 Claims, 7 Drawing Sheets

AUTOMATIC ACCESS TO INFORMATION SERVICE PROVIDERS

TECHNICAL FIELD

The present invention relates to methods and system structures for automatically routing calls to customer selected information sources using a dedicated short access number.

ACRONYMS

The written description uses a large number of acronyms to refer to various services and system components. Although known, use of several of these acronyms is not strictly standardized in the art. For purposes of this discussion, acronyms therefore will be defined as follows:

Area Wide Centrex (AWC)
Action Control Point (ACP)
Advanced Intelligent Network (AIN)
Advanced Services Platform (ASP)
Automatic Number Identification (ANI)
Common Channel Inter-office Signalling (CCIS)
Data and Reporting System (DRS)
Dual Tone Multi-Frequency (DTMF)
Information Service Provider (ISP)
Integrated Service Control Point (ISCP)
Integrated Services Digital Network (ISDN)
Local Access and Transport Area (LATA)
North American Numbering Plan (NANP) Number
Personal Identification Number (PIN)
Private Branch Exchange (PBX)
Private Automatic Branch Exchange (PABX)
Service Circuit Node (SCN)
Service Control Point (SCP)
Service Creation Environment (SCE)
Service Management System (SMS)
Service Switching Point (SSP)
Signaling System Seven (SS#7)
Signaling Transfer Point (STP)
Station Message Detail Recording (SMDR)
Service Creation Environment (SCE)
Telephone Company (TELCO)
Transaction Capabilities Applications Protocol (TCAP)

BACKGROUND ART

There is an increasing demand to obtain a wide variety of information over telephone lines. Many different companies provide information services in a wide range of formats including voice messages, computerized data bases, facsimile data, etc. The variety of information these services provide is virtually limitless. Examples include news, weather and traffic information, sports information and stock ticker data. Information service providers also may take orders for products and services, or offer other kinds of interactive functions. Typically, each Information Service Provider (ISP) will connect the equipment to provide the information in facsimile, data or voice form to one or more telephone lines. In the existing telephone network, each line connected information source has a telephone number. Typically, to access that source, a caller dials the complete telephone number for that source. To access a different source, the caller must dial a different number.

Alternatively, one information service provider might operate more than one source, for example a newspaper has a headline news service, a sports section service, a business service, etc. If such a provider does not want to require a separate number for each service, the provider could use a PBX or Centrex system with an automated attendant type feature. Typically, the user would call one published number for the information service provider. The automated attendant system answers the call, and the caller dials in a selection identifying the provider's one service the current call should connect to. The PBX or Centrex would then connect the call to the appropriate information source. To reach a different information service provider, however, the caller must still know and use a different telephone number.

In the existing systems, whether one number identifies each actual source or identifies a collection of information services of one information provider, the numbers are all complete telephone numbers. If the call to the service provider is a local call, dialing requires seven digits. If the call is a long distance call, or the service uses an 800 or 900 type number, the telephone number dialed is ten digits. Remembering and using a collection of seven and ten digit numbers to access all information sources a telephone subscriber might be interested in is complicated and may actually discourage customers from using more than one or two different information service providers.

Clearly there is a need for a simpler access procedure in order to encourage increased public use of information services provided over the telephone network.

It has recently been proposed to use a three-digit access approach. Each information service provider would be assigned a three digit number, and the telephone network would route all calls to the service provider whenever a caller initially dialed those three digits. The three digit numbers would be "N11" type special dedicated numbers easily recognized by the telephone system, similar to the 911 number used for emergency calls and the 411 number used for directory assistance. The number of dedicated three digit numbers available, however, is quite limited. In fact there are currently only four such numbers, 211, 311, 511 and 711 not already in use. The available N11 type three digit numbers therefore constitute an extremely scarce resource. The proposed three digit access system would use up all four of the available N11 numbers. Another drawback of the proposed three digit access system is that the caller could access only four information service providers using the three digit numbers. One number would be dedicated to each information service provider.

Thus a need exists for a system using a short access number or code to a large number of information providers. To the extent that the system uses special dedicated numbers, such as N11 numbers, the system must use as few as possible of such dedicated numbers.

In a related field, an Advanced Intelligent Network (AIN) has been developed to provide centralized control of telephone services provided to customers through diversely located central office switching systems. In an AIN type system, central offices send and receive data messages from a Service Control Point (SCP) via a Switching Transfer Point (STP). At least some calls are then controlled through multiple central office switches using data retrieved from a data base in the SCP. In recent years, a number of new service features have been provided by such a network.

U.S. Pat. No. 4,756,020 issued Jul. 5, 1988, to Joseph V. Fodale, for example, suggests access authorization in a multiple office environment. The Fodale system restricts access to a long distance telephone network based on the status of the billing number associated with the call, i.e. delinquent. The access control is provided through multiple local and toll offices but is centrally controlled by a data base which stores account status information. The local office serving a calling telephone extends a toll call to the toll office of the toll network carrier. The toll office queries the data base via a CCIS link regarding the current status of the customer's account identified by the billing number associated with the call. The data base obtains the status information of the billing number in question and translates that status into a response message instruction to allow or disallow extension of the toll call through the toll network. The data base transmits the response message to the toll office via CCIS link, and the toll office disallows or extends the call through the toll network as instructed by the response message.

A number of the features provided by the prior art AIN type intelligent networks relate to specialized call processing of incoming calls, as discussed below.

U.S. Pat. No. 4,191,860 issued Mar. 4, 1980, to Roy P. Weber discloses a system for providing special processing of incoming calls via a number of local switching offices based on information stored in a central data base. The local and toll offices of the telephone network compile a call data message and forward that message via a CCIS link to the central data base, essentially a Service Control Point or SCP. The data base at the SCP translates the dialed INWATS number, included in the message, into a call control message. The call control message includes an unlisted destination telephone number, which is then returned to the offices of the network via CCIS link. The network uses the call control message to complete the particular call.

U.S. Pat. Nos. 4,611,094 and 4,611,096 both to Asmuth et al. disclose a system for providing custom incoming telephone call processing services to a corporate customer operating at geographically dispersed locations through a plurality of local office switches. A customer program stored in a central data base is accessed to provide instructions to the switches to complete incoming calls to customer locations in accord with special services defined by the corporate customer. Incoming calls to the customer are routed to an Action Control Point (ACP) which typically is a modified toll office. The ACP has a number of "primitive" call processing capabilities, such as providing voice prompts to callers and receiving additional caller inputs. The customer program controls the ACP's to string together the desired primitive call processing capabilities to process each call to the customer. Specified parameters stored in the program, such as time of day, caller location and data inputs responsive to the voice prompts, determine the final customer station to which each cell should be completed. The customized call processing disclosed by Asmuth et al. can also include customized billing for calls, e.g, by splitting charges between the customer and the caller. The Asmuth et al. system sets up a billing record for each call in the ACP or toll office. Asmuth et al. also teach procedures for handling of calls directed to a corporate customer when the call serving office does not have all of the capabilities needed for processing the call in accord with the subscriber's stored program. In particular, upon recognition of the deficiencies of the call serving office, the Asmuth et al. system transfers call processing to a second office having adequate capabilities for completion of the call.

U.S. Pat. No. 4,788,718 issued Nov. 29, 1988, to Sandra D. McNabb et al. suggests centralized recording of call traffic information. The architecture is similar to that disclosed by the earlier discussed patents to Weber and Asmuth et al. to the extent that local and toll offices communicate with a central data base via CCIS link. The McNabb et al. system improves over the incoming call routing provided by the Weber patent and the two Asmuth et al. patents discussed above by adding a data gathering function to the centralized data base which stores the individual subscriber's call routing program. In McNabb et al. the central data processor provides call attempt records and a traffic data summary of all calls directed to a particular 800 number.

U.S. Pat. No. 4,757,267 issued Jul. 12, 1988, to Bernard J. Riskin teaches routing of an 800 number call, where the dialed number identifies a particular product or service, to the nearest dealer for the identified product or service. The toll office sends a message including the dialed 800 number and the area code of the caller to a data base which translates this into a standard ten digit telephone number for the nearest computer at a Customer/Dealer Service Company (CDSC). The telephone network then routes the call to this computer, which answers the call and provides a synthesized voice response. The computer uses call data and or Touchtone dialed information from the caller to identify the selected product or service and then accesses its own data base to find the telephone number of one or more nearby dealers in that product or service. The computer then calls the dealer and connects the original caller to the called dealer.

Several other patents use a network similar to the AIN type intelligent network to provide personalized services to individual subscribers, for example when they are away from their home telephone station.

U.S. Pat. No. 4,313,035 issued Jan. 26, 1982, to David S. Jordan et al. patent discloses a method of providing a person locator service through multiple exchanges of the switched telephone network. Each subscriber is assigned a personal number uniquely identifying the subscriber. An absent subscriber inputs a number to which calls are to be completed, such as the number where the subscriber can be reached, into a central data base. A caller wishing to reach the subscriber dials the number uniquely identifying that subscriber. In response to an incoming call directed to the unique number, a telephone switching office having access to CCIS sends the dialed number to the central data base referred to by Jordan et al. as an SSP. The data base retrieves the stored completion number for the called subscriber and forwards that number back to the switching office to complete the call. The subscriber can update the stored data from any telephone. Also, the subscriber can specify whether to charge calls via the person locator system to the subscriber or to the caller.

U.S. Pat. No. 4,899,373 issued Feb. 6, 1990, to Chinmei Lee et al. discloses a system for providing special telephone services to a customer on a personal basis, when the customer is away form his or her home base or office. A nationally accessible data base system stores feature data in association with personal identification numbers. A subscriber wishing to use personalized features while away from home base dials a special code from a station connected to any exchange which has access to the data base and presents the personal identification number. The corresponding feature data is retrieved from the data base and stored in the exchange in association with the station from which the request was initiated. The exchange then provides telephone service corresponding to the subscriber's personalized telephone features. A temporary office arrangement may be established in which the personalized features will be immediately available on incoming and outgoing calls for a period of time specified by the subscriber.

Further modifications of the AIN system allow a TELCO to customize the routing of telephone calls via a graphical programming language used on a specialized terminal by telephone company personnel.

As seen from the cited patents, the prior art AIN systems have not provided a single unified system for accessing information services from a wide variety of sources without providing separate numbers to reach each information provider and/or each information source.

DISCLOSURE OF THE INVENTION

1. Objectives

One objective of the present invention is to provide access to information services from a large number of service providers using a short access code. The access code has fewer digits than are needed to identify a destination station. The information provided can be in voice, data, facsimile or video formats, or combinations thereof.

Another objective of the present invention is to use prestored selection data to route short access code type calls to a selected information source.

Another objective of the present invention is to initiate an interactive prompt and input sequence, following short access code dialing, to obtain selection information and route a call to an information service provider.

A more specific objective is to use an intelligent communication network, storing routing data in a centralized data base, to selectively route information service calls based on preprogrammed selection data for the caller stored in a central data base, or based on a combination of prestored selection data and interactive inputs from the caller. Alternatively, the network would initiate prompting of a casual caller for various inputs to determine which service the caller currently wants to access.

A further objective is to provide centralized program control to facilitate customizing of routing and call processing procedures for different subscribers and for accessing different provider's services.

Another objective is to allow easy modification and updating of the stored data to suit a subscriber's current needs for accessing different information sources.

A still further objective of the invention is to provide customized access authorization procedures, as defined by the subscriber or as defined by the information service provider.

2. Summary of the Invention

To achieve the above stated objectives, the present invention provides access to a large number of information sources in response to dialing of a short dedicated access code, such as an N11 telephone number. The system can use a single access code number for all calls, or a first code number for preprogrammed call processing and a second number for casual access. The system routes information service calls based on preprogrammed selection data for the caller stored in a data base, or on a combination of prestored selection data and interactive inputs from the caller. Alternatively, the system prompts a casual caller for various inputs to determine which service the caller currently wants to access. In the preferred embodiment, the user only needs to know a single three digit N11 type access number. An alternate embodiment uses two N11 type access numbers, such as 211 or 511.

The information services may take the form of voice messages, computerized data, facsimile data, video services, etc. Also, the information service providers may take orders for products and services, or offer other kinds of interactive functions.

In a first aspect, the invention is a method of routing calls to selectively provide communication links between calling communication stations and selected stations of information service providers. The invention recognizes dialing from a calling communication station of a specific code number prior to dialing of any other digits. The specific code number consists of a predetermined number of digits fewer than a minimum number of digits necessary to completely identify a destination communication station. Upon recognition of the dialing of the specific code number, stored data associated with the owner of the calling communication station is accessed. The accessed information indicates call processing procedures which the owner has selected for handling of information service calls. The network executing the call processing method then routes the call from the calling communication station to an information service provider's station based on the call processing procedures determined from the accessed information.

In the preferred embodiments, the call processing methods for accessing information services using a short code are implemented in an intelligent communication network having a plurality of interconnected central office switching systems, each at a different location. Each of the central office switching systems connects to a number of local communication lines. Each central office switching system normally responds to a request on a local communication line connected thereto to selectively connect the requesting line to another selected local communication line. The connection can be made locally through only the connected central office switching system, but when the called line connects to a distant station the connection is made through the connected central office switching system and at least one other central office switching system.

In a second aspect, the present invention is an information service call method using the above discussed intelligent network. This method includes the step of designating a subset of the plurality of local communication lines. The designation of these lines associates the lines with subscribers to one or more of the information services. A central data base, separate from the central office switching systems, stores data identifying an information service provider selected by each of the customers. The method further includes recognizing dialing on a local communication line of a specific code number prior to dialing of any other digits. Again, the specific code number consists of a predetermined number of digits fewer than are necessary to completely identify a destination local communication line. The system interprets dialing of the specific code number as a request for access to an information service. If the system recognizes that the request for information service access originates from one of the designated local communication lines, the stored data in the central data base is accessed to identify the information service provider selected by the calling subscriber. The data base provides this information to the central office switching system(s) for use in routing the call from the calling communication station to a station associated with the information service provider selected by the one customer.

The system can be programmed to accept a selection input following the initial dialing of the short code. If the caller dials certain numbers at this point the system executes an interactive routine with prompts and DTMF inputs of additional information, either to identify one of the customer's prestored selections from a menu or to uniquely identify a specific destination for a casual call to an information source provider. Here the call may be a "causal" call either because the caller has not selected a preprogrammed information source provider or because a customer wants to access an information source not included as a prestored selection in that customer's file in the central data base. Alternatively, the system can use a second short access code, for example another N11 number, for processing of casual calls.

The use of a programmable central data base also facilitates customized call processing for different customers and for access to different provider's services. Furthermore, the system allows easy modification and updating of the stored data to suit a customer's current needs for accessing different information sources. Stored data associated with a customer or stored data associated with an information service provider can activate an access authorization procedure, as defined by the customer or as defined by the information service provider.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BEST MODE FOR CARRYING OUT THE INVENTION

Figure 1:
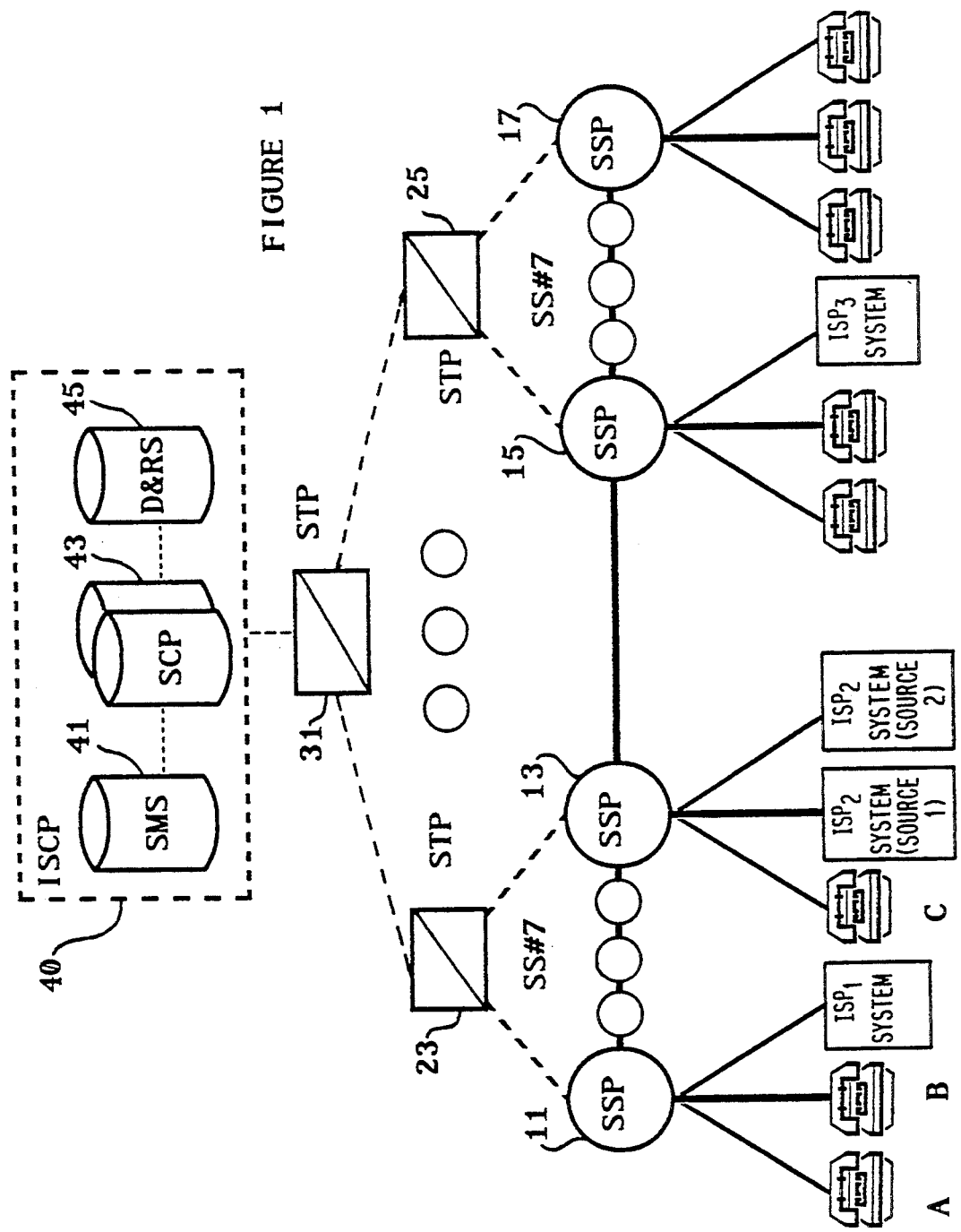
FIG. 1 is a schematic block diagram of the components of an Advanced Intelligent Network system of the first embodiment of the system for implementing the invention.

In the system shown in FIG. 1, each of the central office switching systems are labeled as an "SSP." The Service Switching Points, referred to as SSP's, are appropriately equipped programmable central office switches present in the telephone network, which recognize AIN type calls, launch queries to an Integrated Service Control Point (ISCP) and receive commands and data from the ISCP to further process the AIN type calls. Each SSP type central office connects to a number of local communication lines, which in turn connect to customer premises telephone equipment (shown in the drawing as standard telephone sets). A number of the local communication lines, however, connect the equipment of information service providers, as indicated in the drawing by the ISP systems.

SSP's can be programmed to recognize a number of different triggers as an indication that a call is an AIN call. For example, the trigger can relate to the terminating station, or the identification of the telephone line from which a call or other request for service originates. For purposes of short code access to information services, the trigger is dialing of the digits of a dedicated specific access code, before dialing of any other digit. Assuming, for example, that each code is an N11 type code such as 211 or 511, the SSP's examine the first three digits dialed for each call and trigger AIN type servicing of a call upon detection that the first three dialed digits were 211 or 511. Alternatively, the SSP's could initiate AIN processing following every detection of off-hook.

As shown in FIG. 1, all of the SSP capable central office switches 11, 13, 15 and 17 are equipped and programmed to serve as SSP's. Such central office switching systems typically consist of a programmable digital switch with CCIS communications capabilities. One example of such a switch is a 5ESS type switch manufactured by AT&T; but other vendors, such as Northern Telecom and Seimens, manufacture comparable digital switches which could serve as the SSP's. The illustrated embodiment is perhaps an ideal implementation which would make short code access to information services widely available at the local office level throughout the network. As will be discussed later, other implementations provide the SSP functionality only at selected points in the network, and end offices without such functionality forward calls to one of the SSP's.

The SSP's 11 and 13 connect to a first local area STP 23, and the SSP's 15 and 17 connect to a second local area STP 25. The connections to the STP's are for signalling purposes. As indicated by the black dots below STP's 23 and 25, each local area STP can connect to a large number of the SSP's. The central offices or SSP's are interconnected to each other by trunk circuits (illustrated in FIG. 1 as bold lines) for carrying telephone services.

The local area STP's 23 and 25, and any number of other such local area STP's shown as black dots between STP's 23 and 25 communicate with a state or regional STP 31. The state or regional STP 31 in turn provides communications with the ISCP 40. The STP hierarchy can be expanded or contracted to as many levels as needed to provide the information service access system to any number of stations and central office switches serving a geographic area of a particular size and population. The links between the central office switching systems and the local area STP's are CCIS links, typically SS#7 type interoffice data communication channels. The local area STP's are in turn connected to each other and to the regional STP 31 via a packet switched data network which also typically is an SS#7 network. The regional STP 31 also communicates with the ISCP 40 via a packet switched data network.

The messages transmitted between the SSP's and the ISCP are all formatted in accord with the Transaction Capabilities Applications Protocol (TCAP). The TCAP protocol provides standardized formats for various query and response messages. Each query and response includes data fields for a variety of different pieces of information relating to the current call. Of particular note here, an initial TCAP query from the SSP includes, among other data, a "Service Key" which is the calling party's address and digits representing the called party address. TCAP also specifies a standard message response format including routing information, such as primary carrier ID, alternate carrier ID and second alternate carrier ID and a routing number and a destination number. The TCAP specifies a number of additional message formats, for example a format for a subsequent query from the SSP, and formats for "INVOKE" responses for instructing the SSP to play an announcement or to play an announcement and collect digits. A TCAP "SEND to RESOURCES" message instructs the switch to access an external resource, for example to obtain an announcement, and collect digits. In the present invention, the SSP provides an announcement and collects digits, in response to an INVOKE message or a SEND to RESOURCES message, at several points in the call processing routines when additional selection information from a caller is necessary.

The present service could be implemented with one or more ISCP's per state, to avoid overloading existing CCIS data links. Alternatively, the ISCP could be implemented on a LATA by LATA basis or on a regional operating company basis, i.e. one data base for the entire geographic area serviced by one of the Regional Bell Operating Companies. In fact, if federal regulations permitted, the data base service could become nationwide.

As shown in FIG. 1, the ISCP 40 is an integrated system. Among other system components, the ISCP 40 includes a Service Management System (SMS) 41, a Data and Reporting System (DRS) 45 and the actual data base or Service Control Point (SCP) 43. The ISCP also typically includes a terminal subsystem referred to as a Service Creation Environment or SCE (not shown) for programming the data base in the SCP 43 for the services subscribed to by each individual customer.

The above described data signalling network between the SSP type central offices and the ISCP is preferred, but other signalling networks could be used. For example, instead of the CCIS links, STP's and packet networks, a number of central office switches and an ISCP could be linked for data communication by a token ring network. Also, the SSP capability may not always be available at the local office level, and several other implementations might be used to provide the requisite SSP capability. For example, none of the end office switches may have SSP functionality. Instead, each end office would connect to a trunk tandem which in turn feeds calls to a central SSP capable switch. The SSP then communicates with the ISCP, as in the implementation described above, but in this case via an SS#7 type CCIS link. The SSP capable trunk tandem switches are digital switches, such as the 5ESS switch from AT&T; and the non-SSP type end offices might be 1A analog type switches.

Although shown as telephones in the drawing, the customer premises terminals can comprise any communication device compatible with the line. Where the line is a standard voice grade telephone line, for example, the terminals could include facsimile devices, computers, modems, digital data equipment, etc. Similarly, the portable handsets can incorporate both standard telephone communication components and other communication devices. In fact, the portable units may not be handsets at all. If desired, the portable unit may comprise any communication device compatible with the system, for example portable facsimile devices, laptop computers, etc.

For each information service offered, the information service provider connects an information source to an incoming telephone line. The sources, referred to as ISP systems in the drawings, may comprise any system responsive to an incoming call to provide information and/or enhanced services. In perhaps the simplest form, the ISP system might comprise a device for answering incoming calls and playing out a single prerecorded voice message. The ISP system might also include a data base. If so, the data base could be accessible via a modem, or the system could detect DTMF tones and output selected items from the data base as synthesized speech (see e.g. U.S. Pat. No. 4,817,129 to Riskin). Also, one or more of the ISP systems could provide data output in facsimile form or in video form. The ISP system could also accumulate input information from the caller, using DTMF tone detection or voice recognition, for example to take orders for products or services. The ISP system serving as the information source can be virtually any telephone line connected system for providing an enhanced service, i.e. a service which is more than a pass through transmission of a customer's own communication signals.

For standard telephone service, each central office switching system normally responds to a service request on a local communication line connected thereto to selectively connect the requesting line to another selected local communication line. The connection can be made locally through only the connected central office switching system. For example, for a call from station A to station B, the SSP 11 provides the call connection without any connection to another central office. When the called line connects to a distant station, for example when station A calls station C, the connection is made through the connected central office switching system SSP 11 and at least one other central office switching system SSP 13 through the telephone trunks interconnecting the two central office switches.

In the normal call processing, the central office switching system responds to an off-hook and receives dialed digits from the calling station. The central office switching system analyzes the received digits to determine if the call is local or not. If the called station is local and the call can be completed through the one central office, the central office switching system connects the calling station to the called station. If, however, the called station is not local, the call must be completed through one or more distant central offices, and further processing is necessary. If at this point the call were connected serially through the trunks and appropriate central offices between the caller and the called party using in channel signalling, the trunks would be engaged before a determination is made that the called line is available or busy. Particularly if the called line is busy, this would unnecessarily tie up limited trunk capacity. The CCIS system through the STP's was developed to alleviate this problem.

In the CCIS type call processing method the local central office suspends the call and sends a query message through one or more of the STP's. The query message goes to the central office to which the called station is connected, referred to as the "terminating" central office; for example, the query would go from originating SSP 11 to terminating SSP 13. The terminating central office determines whether or not the called station is busy. If the called station is busy, the terminating central office so informs the originating central office which in turn provides a busy signal to the calling station. If the called station is not busy, the terminating central office so informs the originating central office. A telephone connection is then constructed via the trunks and central offices of the network between the calling and called stations. The receiving central office then provides a ringing signal to the called station and sends ringback tone back through the connection to the calling station.

The call processing routines discussed above are similar to those used in existing networks to complete calls between stations connected to land lines. In an AIN type network system implementing short code access to information services, these normal call processing routines would still be executed for completion of calls between customer stations and even for information service calls not using the access code.

When a call is routed from a calling customer station to a station assigned to an information service provider, the central office switching systems connect the requesting line to another selected local communication line which connects to the selected ISP system. If the line to the ISP system connects to the same end office as the caller's line, the connection is made locally through only the connected central office switching system. For example, for a call from station A to the $ISP_1$ system, the SSP 11 provides the call connection without any connection to another central office. When the called ISP system line connects to a distant central office switch, for example when station A calls either of the $ISP_2$ systems labeled source 1 and source 2, the connection is made through the connected central office switching system SSP 11 connected to the calling station A and at least one other central office switching system SSP 13 and the telephone trunks interconnecting the two central office switches. Each of the local communication lines which connects to one of the ISP systems has a different assigned telephone number. As discussed in detail below, however, the present invention eliminates the need for the caller to remember all the different telephone numbers for the different ISP systems.

The present invention uses a short access code to trigger routing of calls to information service providers. The system can prompt a caller for further inputs and receive dialed digits, if necessary, to obtain a selection of an individual information service provider and/or an individual service from that provider. The ISCP provides instructions to the originating SSP telling it to provide any necessary announcements and collect any necessary digits at various points in the call processing sequence. The ISCP analyzes the collected digits input by the caller and retrieves data from a customer's file and/or from a file for the information service provider and determines the complete telephone number to which the selected ISP system is connected. The ISCP provides that complete destination number to the originating SSP which then uses that complete telephone number to route the call. For example, assume that a customer at station A wants to access the information service provided through the $ISP_3$ system. The customer dials the dedicated short code, e.g. 211, on station A. The ISCP derives the complete telephone number for the $ISP_3$ system, for example 703-987-6543, from its stored programs and any necessary interactive inputs, and provides that ten digit number to the SSP 11. The SSP 11 routes the call through the SSP 15 and the interconnecting trunk circuits to the $ISP_3$ system using the CCIS type call routing procedures discussed above. The short code responsive AIN type call processing routines will be discussed in detail below with regard to FIGS. 5A to 6.

Figure 2:
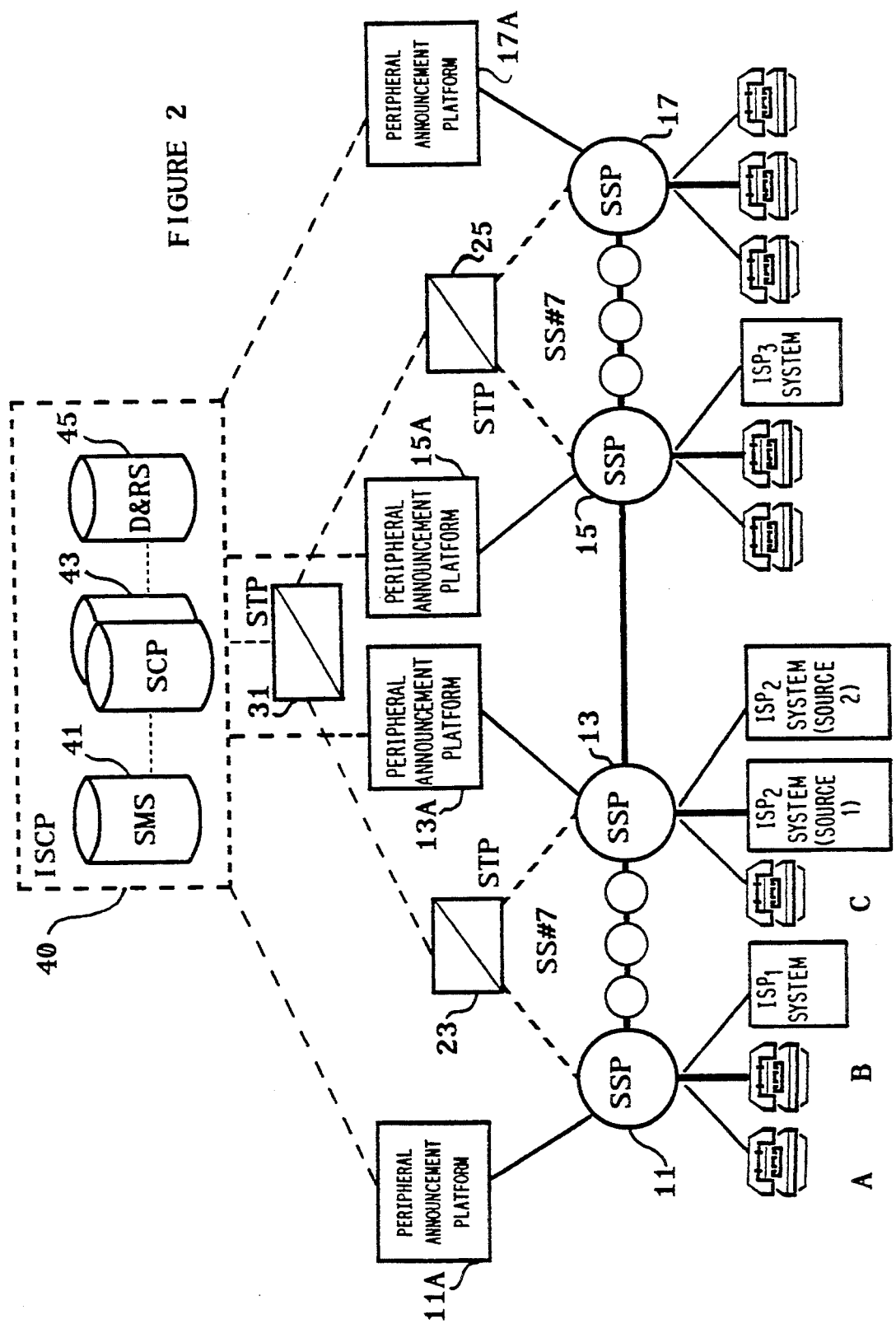
FIG. 2 is a schematic block diagram of a modified form of the Advanced Intelligent Network system of FIG. 1.

The SSP type switch, such as the 5ESS switch manufactured by AT&T, includes a message platform. Typically the message platform provides service announcements used in telephone call processing. These announcements include a number of tone signals and synthesized speech messages. In the system of FIG. 1, any announcements used for the short code access to information services would be provided by message platforms of the SSP's in response to the "INVOKE" type messages from the ISCP. This approach, however, requires reprogramming the platform in the switch itself to provide different messages. Also, the capacity of the message platform to provide a variety of messages is limited, and this limited capacity restricts the number and variety of messages which the system can provide during information service call processing. FIG. 2 therefore shows a modified version of the system which can provide a wider variety of announcements.

As shown in FIG. 2, each of the SSP type central offices 11, 13, 15 and 17 connects to a peripheral announcement platform 11A, 13A, 15A and 17A, respectively. The peripheral announcement platforms each connect to the associated SSP switch via an Integrated Services Digital Network (ISDN) link shown as solid lines, for carrying both voice and signaling data. The peripheral announcement platforms also connect via a packet switched data communication network, such as x.25, to the ISCP.

Each peripheral announcement platform comprises a programmed system for synthesizing voice announcements in response to command data from the ISCP. For example, the peripheral announcement platforms might each include a personal computer with an X.25 interface and a text to speech type voice synthesizer and an ISDN interface.

The network of FIG. 2 operates essentially the same as the network of FIG. 1. Some or all of the various INVOKE messages used in processing calls through the system of FIG. 1, however, are replaced with a "SEND to RESOURCE" type TCAP message from the ISCP instructing an SSP to access a resource and collect digits. This message identifies a particular resource, in this case an ISDN type voice channel to the associated peripheral announcement platform. Each time the ISCP sends such a "SEND to RESOURCE" message to an SSP, the ISCP concurrently sends a message through the X.25 data link to the associated peripheral announcement platform. This message tells the platform what message to play on the specified ISDN channel at that time. If the message announcement platform has a text-to-speech converter, the announcement could take the form of virtually any desired script.

As discussed briefly above, other intelligent network architectures can implement the inventive short code access to information services. Two particularly significant example appear in FIGS. 3 and 4.

Figure 3:
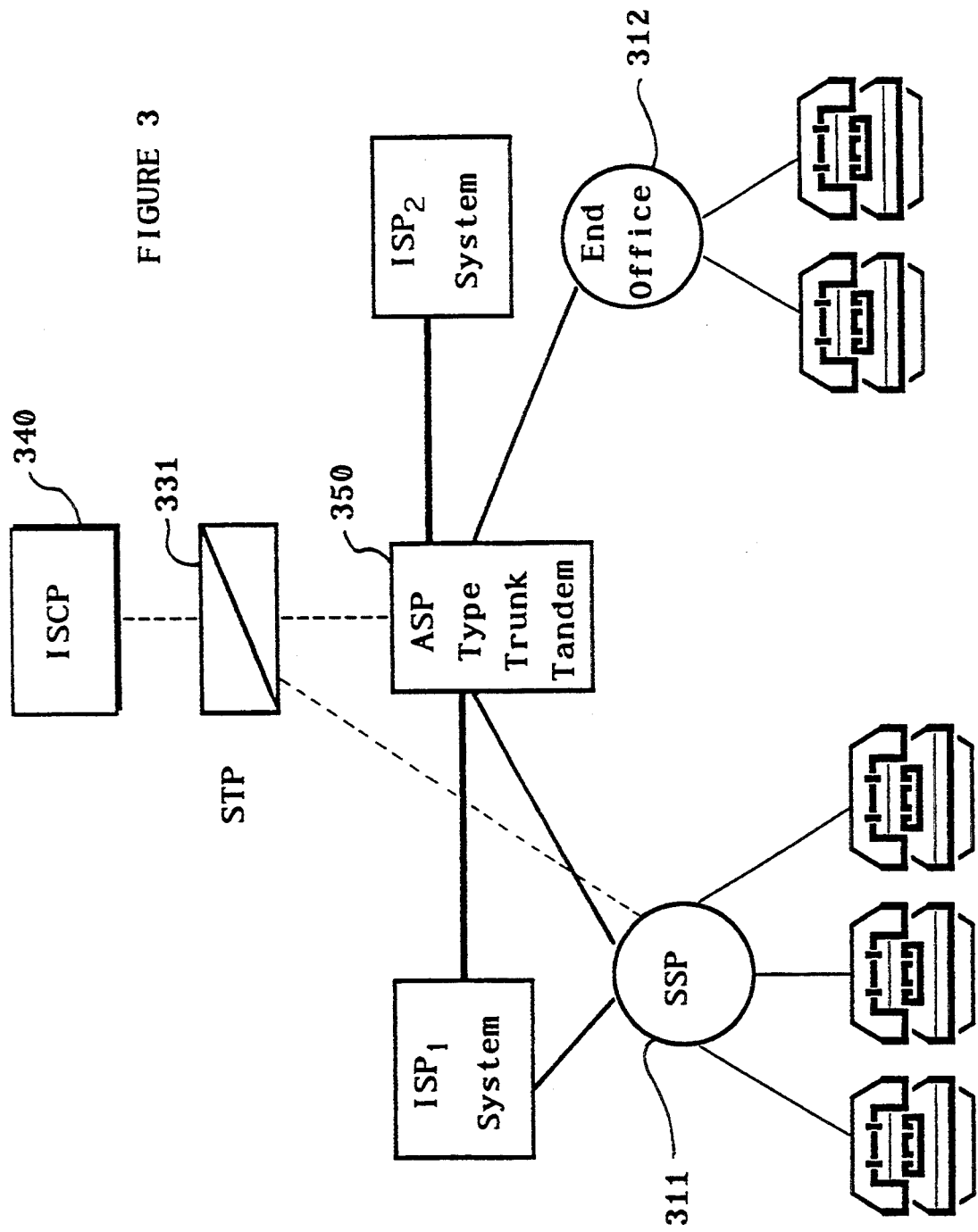
FIG. 3 is a schematic block diagram of an alternate embodiment of the Advanced Intelligent Network system for implementing the invention.

As shown in FIG. 3, the SSP 311 and the end office 312 each connect via local communication lines to a number of customer premises equipment terminal devices and connect via trunk circuits to a trunk tandem 350. A local office is essentially a switching system providing switched connections between local lines and trunk circuits, whereas a trunk tandem is a switching office which provides trunk to trunk connections.

The architecture of FIG. 3 provides connections to the information service provider's systems through the trunk tandem. For example, the $ISP_2$ system connects via a trunk directly to the tandem 350. In contrast the $ISP_1$ system connects via a local communication line to the SSP type end office 311 and via a trunk circuit to the tandem 350. The trunk connections to the tandem reduce loss of service to the information service providers since all calls to $ISP_2$ system would go through the tandem and trunk circuits and would not be interrupted by failures of any one end office. Similarly, the network would alternately route calls to the $ISP_1$ system through the tandem and trunk circuits in the event of failure of the SSP 311 or of the local communication line between that office and the $ISP_1$ system. An information service provider whose system must handle a high volume of calls and can not afford substantial service interruption might use two sources, such as the $ISP_1$ and $ISP_2$ systems shown in FIG. 3, and the ISCP would be programmed to route calls to the second system in the event the first failed.

The office 311 is an SSP type office and connects to an STP 331 for communication with distant offices (not shown) and with the ISCP 340. The end office 312 does not have SSP capability, however, the ASP type trunk tandem 350 can recognize AIN triggers and provide communications with the ISCP 340 via STP 331. For AIN type calls, such as for the short code access to information services, the SSP capable switch 311 communicates directly with the STP 311 which relays communications to and from the ISCP, in the same manner as in the embodiment of FIGS. 1. The end offices, such as 312 which lack SSP capability, routes short code calls, e.g. in response to a recognized N11 code, to the trunk tandem 350, For such calls the tandem suspends call processing, and relays data to and from the ISCP in a manner similar to that performed by the SSP. The ASP type trunk tandem switch is a digital switch, such as the 5ESS switch from AT&T; and the non-SSP type end offices might be 1A analog type switches. The trunk tandem would provide all necessary announcements for information service calls arriving through end office 312, using the built in announcement frame or using an associated peripheral announcement platform (not shown) similar to those discussed above with regard to FIG. 2. This network architecture and call processing allow customers to use the short code access to information services through virtually any type of end office switch.

Alternatively, all short access code type calls for information services could go through the ASP type trunk tandem. Both the SSP 311 and the non-SSP type end office 312 would respond to the short code, e.g. 211 or 511 by routing the calls to the trunk tandem and forwarding all ANI information to the tandem. The ANI includes both the called number, in this case the 211 or 511, and the calling number. The short code would trigger AIN type query and response processing between the tandem 350 and the ISCP 340. This approach has the advantage that all information service call announcements would have to reside in only the tandem or its associated peripheral announcement platform, without providing the announcements at each end office.

Figure 4:
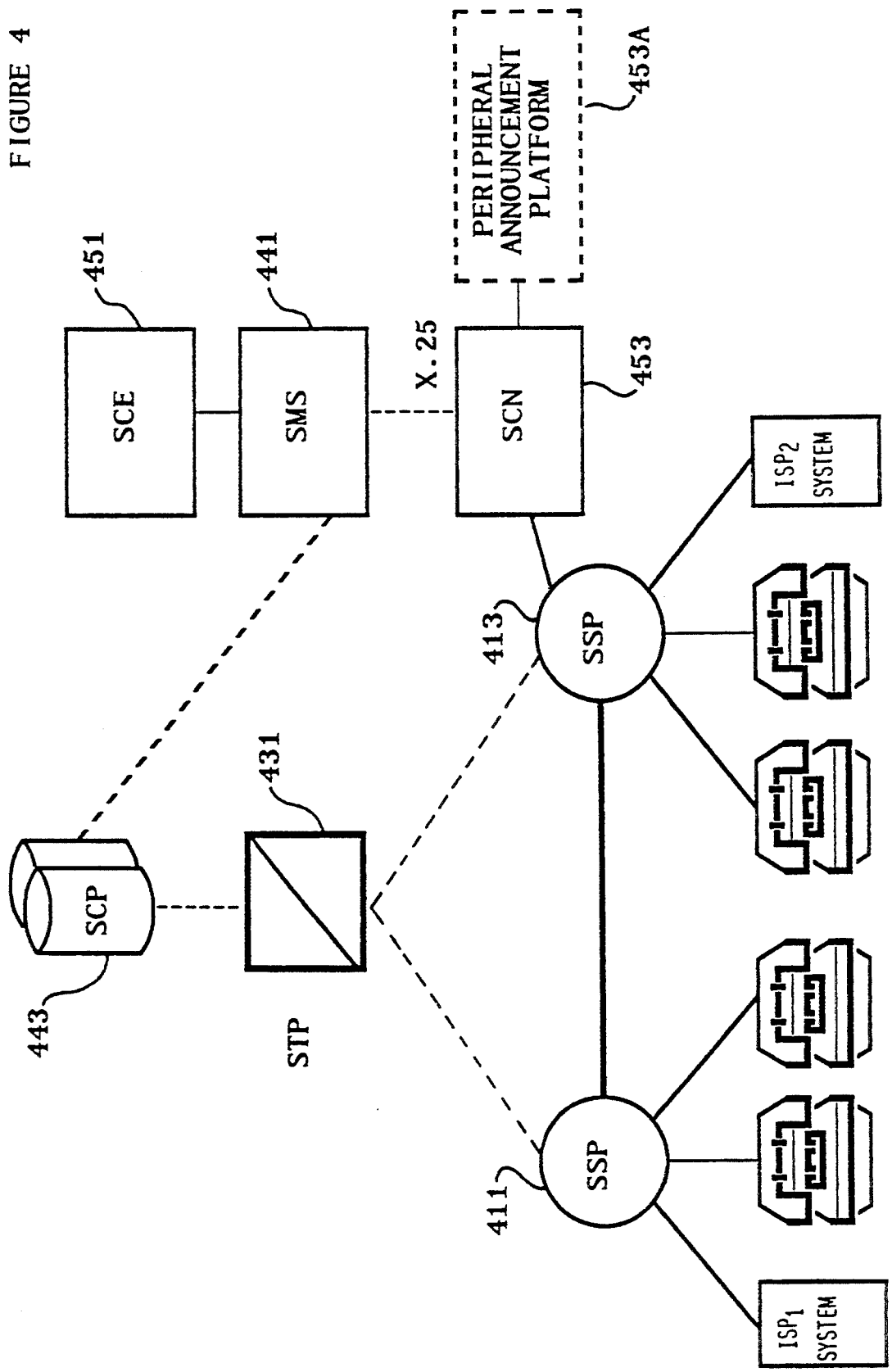
FIG. 4 is a schematic block diagram of a further embodiment of an Advanced Intelligent Network system for implementing the invention.

FIG. 4 illustrates an intelligent network architecture, using distributed intelligences rather than a single Integrated Services Control Point (ISCP). In the illustrated example, The SSP type central offices 411, and 413 each connect to a number of customer premises terminal stations and to one or more ISP systems via local communication lines. The SSP's are interconnected via voice trunks, and the SSP's 411 and 413 connect to an STP 431. The STP 431 routes data signalling type communications between the SSP's, between the SSP's and distant offices (not shown), and between the SSP's and an SCP 443. In this case, the SCP 443 is essentially only a computerized data base.

The SCP 443 in turn connects to a Service Management System (SMS) 441. A technician inputs new or modified service data through a terminal subsystem referred to as a Service Creation Environment or SCE 451, and a validation process within the SMS 441 checks the input for completeness and compatibility with the existing programs of the network. The service data is then loaded as necessary into the database in the SCP 443, and as needed into a Service Circuit Node (SCN) 453.

The Service Circuit Node (SCN) 453 is actually the key logic element in this embodiment of the invention. The SCN connects via a direct voice and data signalling link to the SSP type switch, and although shown as a separate element is typically an adjunct processor device directly associated with one of the switches. The SCN 453 stores the actual control programs and many of the look up tables for controlling actual call processing.

In the network of FIG. 4, one of the SSP's will detect when a caller at one of the terminal stations dials the dedicated short number code, e.g. an N11 code. That SSP will then launch a TCAP query through the STP 431 to the SCP 443. The SCP checks its data base to determine that the caller is a customer and determines what general type of service the caller has requested, in this case that the caller has requested access to an information service by dialing the N11 code. The SCP transmits a "SEND to RESOURCES" message back to the originating SSP instructing that SSP to access a channel to the SCN 453. The SCP also sends a message through the SMS 441 and the X.25 packet switched data network to the SCN 453 telling the SCN what type of call processing routine to execute. As needed, the SCN looks up information in its data tables relating to the calling customer and any identified information service provider, and the ISP decides how to complete the call without further reference to the SCP.

For interactive processing, playing announcements to the caller and collecting digits, the SCN 453 may include an announcement frame similar to that included in an SSP, or the SCN may connect to a announcement platform 453A.

Call Processing Using a Single Access Code

Figure 5A:
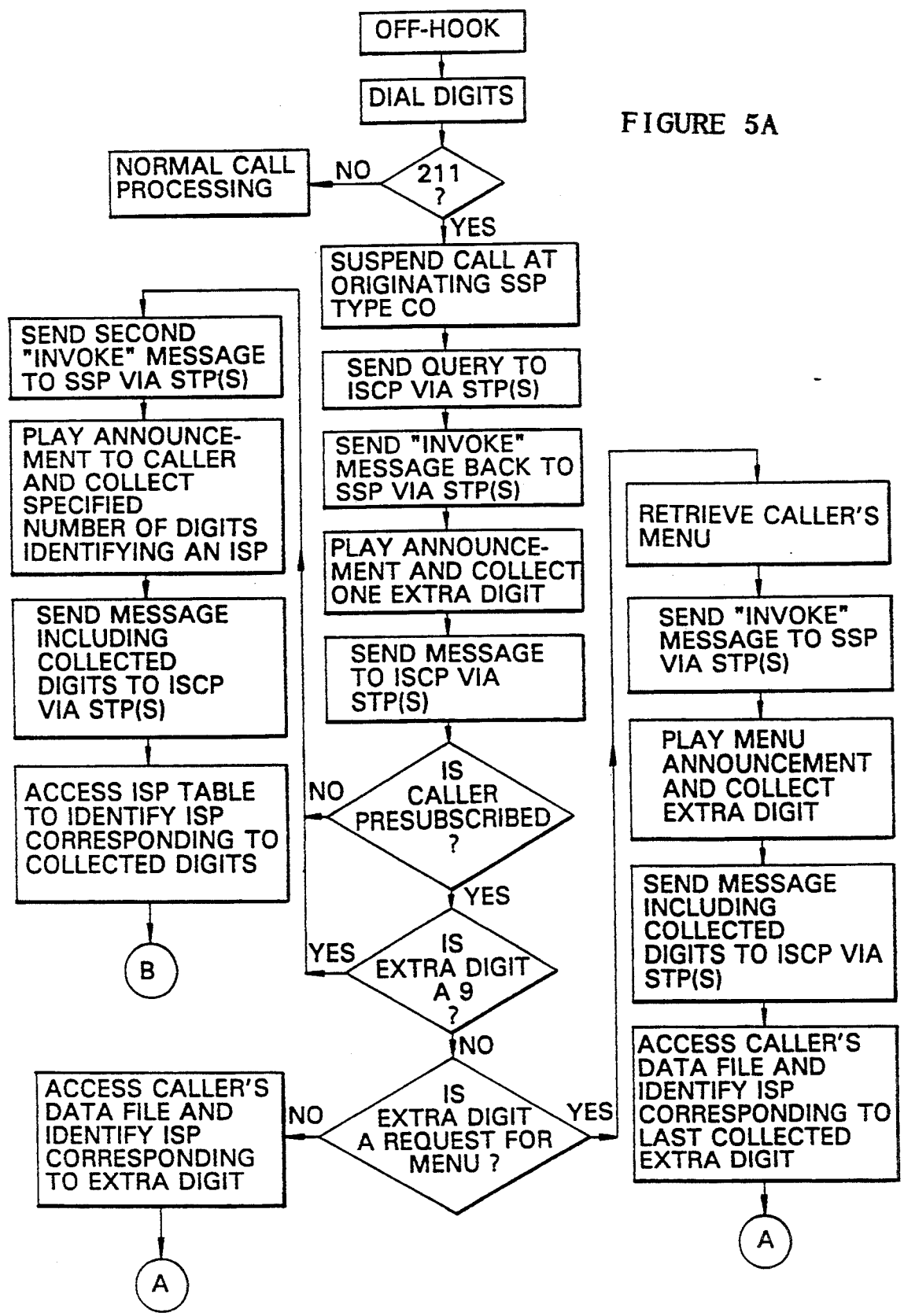
FIGS. 5A and 5B form a flow chart showing an example of the call processing routine of the present invention for providing access via a single short access code, e.g. one three digit number.
Figure 5B:
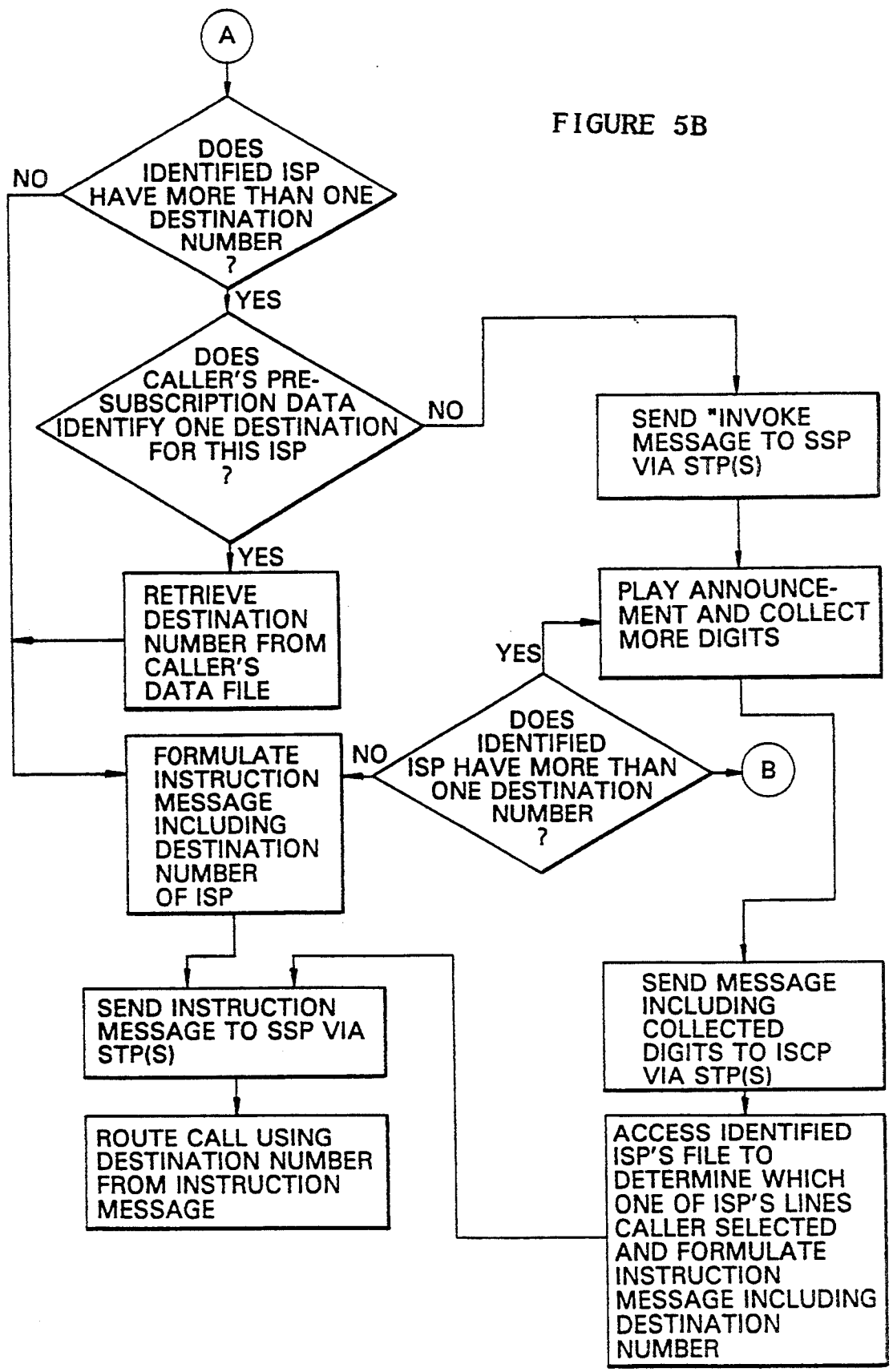

FIGS. 5A and 5B illustrate an example of the call processing, in flow chart form, for the preferred embodiment using the system shown in FIG. 1 and using only a single dedicated access number.

To initiate any call, a telephone user takes the telephone handset off hook and dials digits. As shown in FIG. 5A, the central office examines the first three digits to determine whether or not the customer has dialed the information service access number. In the example used here, the number is an N11 type three digit number, specifically 211. Other N11 numbers or other specific numbers of fewer or more digits could be desired, so long as the system recognizes an initial dialing of those digits as a request to access an information service provider.

Assuming that the system uses the 211 as the access number for the information service provider, if the caller has not dialed 211 as the first three digits, the system executes its normal call processing routines. In a typical case this involves collecting seven or ten digits to identify a local or long distance call destination and completing the call to the dialed destination. Thus, the digits 211 can be included in standard seven or ten digit telephone numbers, so long as the digits 211 are not the first three digits of the telephone number.

If the first three dialed digits were 211, the system processes the call as an information service call. The originating SSP type central office (CO) suspends the call and sends a query to the ISCP via one or more STP's. This query message is in the above described TCAP format for an initial query from an SSP. The query message includes a substantial amount of relevant information. For purposes of this discussion, the important elements of the message are the dialed digits and the identification of the telephone line from which the party originated the present call. Using current TCAP query protocols, the SSP will pad the three digit number to form at least a seven digit dialed number. For example, the SSP would convert 211 to 550-1211. In future, however, as the software modules in the SSP's and the ISCP are updated, the query message would provide only the actual digits dialed, e.g. only 211. The originating SSP sends the TCAP query via a CCIS link to an STP. The STP recognizes that the query is addressed to the ISCP and retransmits the query, either directly or through a further STP, and through the packet switched network as in FIG. 1, to the ISCP.

The ISCP recognizes the dialed digits, either the three digits actually dialed or the padded number including the dialed three digit number, as a request for connection through the network to an information service. The ISCP therefore sends a TCAP "INVOKE" message. The INVOKE message instructs the originating central office to provide an announcement to the user. The announcement could be in the form of a subsequent dial tone or synthesized speech message. If a tone message is used, the service providers would advertise the system with instructions as to what digit to dial at this point in the procedure, and persons who use the system regularly would know how to respond at this time. If the system uses a synthesized voice prompt, the message would tell the caller that if the caller is not preprogrammed or wishes to access an information service provider other than those currently preprogrammed into that customer's file, the caller should dial a specific digit, e.g. 9. The specific digit, in our example the digit 9, therefore indicates that the present call is a casual access call.

The INVOKE message sent by the ISCP also instructs the originating central office SSP to subsequently collect a specified number of digits. The system could collect two digits at this point, but in the exemplary call process of FIG. 5A, the system collects only a single extra digit. The central office collects the extra digit, for example a DTMF dialed digit sent from the calling station, and sends a subsequent message to the ISCP via the STP(s) including the collected digit. The ISCP analyzes the dialed digit and the calling line identification data from the original TCAP query and decides how to proceed.

If the caller is not preprogrammed to the system, or if the collected extra digit is the specific digit, e.g. 9, the ISCP processes the call as a casual call using an interactive routine. Specifically, the ISCP sends a second TCAP "INVOKE" message instructing the originating SSP to provide another announcement to the caller and collect digits. The second announcement could also be in the form of a subsequent dial tone or synthesized speech message. The second announcement serves to ask the caller to enter a specified number of additional digits identifying a particular Information Service Provider (ISP). In a preferred embodiment, each provider might have an assigned four digit identification code which the provider would publicize in advertisements for the provider's services. The casual caller therefore would dial a selected provider's four digit identifier at this point.

Four digits have been used as an example, but the system could use fewer or more digits to identify providers. The number of digits depends on how many different information service providers the system should route calls to. If three digits are used and the announcements to this point are tone signals, the caller has dialed 211, heard a tone, dialed 9, heard a second tone, and dialed three more digits such as 123. The provider therefore would advertise the service as accessible via the seven digit number 211-9-123. A three digit identification scheme allows the system to service a thousand information service providers, and a four digit scheme would allow the system to identify ten thousand information service providers.

The originating central office SSP collects the specified number of dialed digits for identifying one of the information service providers and sends a subsequent message to the ISCP via the STP(s) including the collected digits. The ISCP uses these latest collected digits to access an ISP table listing all of the information service providers and thereby identifies which Information Service Provider (ISP) the current caller selected. Processing then proceeds to B in FIG. 5B. The ISCP checks the data file for the particular information service provider identified by the digits and determines if this provider operates information sources accessed through more than one destination number.

If the particular service provider uses only one access number, the ISCP formulates an instruction message including the destination number of that information service provider and sends that message to the SSP via the STP's. The SSP type office then routes the call using the destination number received in the instruction message.

The information service provider may operate different information sources, for different types of information, which a call accesses via a different line assigned a different destination number. For example a newspaper might provide sports information using a voice message replay machine on one line, headline news on another line, and a computer data base on a third line. In such a case, when the ISCP checks the data file for the particular newspaper type information service provider, that data file will indicate that the identified provider has sources accessed through more than one destination number. The ISCP sends another TCAP "INVOKE" message instructing the originating SSP to provide a further announcement to the caller and collect digits. The number of extra digits is determined by the number of separate sources operated by the identified information service provider, as indicated by that provider's data file. The text of the message could also be specified in the provider's file. This announcement could also be in the form of a subsequent dial tone but preferably is a synthesized speech message asking the caller to enter a specified number of additional digits identifying a particular information source destination for the current information service provider (ISP).

The SSP sends the announcement to the caller, collects the specified number of additional digits and sends a message including those digits back to the ISCP via the STP's. Using these latest collected digits, the ISCP accesses a data file for the identified information service provider and retrieves the corresponding destination number. The ISCP then formulates an instruction message including the destination number of the selected source for this information service provider and sends that message to the SSP via the STP's. The SSP type office then routes the call using the destination number received in the instruction message. The destination number may be seven, ten, fifteen or more digits and result in routing of the call to virtually anywhere in the world. The casual user, however, did not have to dial the complete destination number, and typically the caller will never know the actual destination number.

Returning to FIG. 5A, where the ISCP analyzed the dialed digit and the calling line identification data from the original TCAP query, the ISCP first determined whether or not the caller was preprogrammed. The ISCP stores information service call routing data for callers designated as customers to this access service, and the ISCP checks to determine if data for this caller is included in its customer files. If the caller is preprogrammed, the ISCP checks the dialed extra digit to determine whether or not the caller dialed 9. If the preprogrammed caller dialed any number other than 9, then the present call should proceed based on the caller's preprogrammed data.

Now the ISCP checks the dialed extra digit to determine if the caller selected the menu option. A second predetermined digit would identify menu selection. For example, if the system uses the digit 8 to represent a menu request, the ISCP now determines whether the present caller input an 8. If there was no dialed menu request, the ISCP assumes that the preprogrammed caller dialed a request for one the information service providers to which the present caller currently is preprogrammed and for which the ISCP stores call routing data.

Since one digit, e.g. 9, identifies a casual service request and a second digit, e.g. 8, represents a request for a menu option, the customer can preprogram as many as eight different information service provides for single digit selection. If the system provides access to an operator, the 0 digit would be assigned for this purpose and the ISCP would recognize the dialing of 0 and instruct the SSP to route the call to an operator station (steps for routing to operator not shown in flow chart). With the operator option, there are still seven digits available for preprogrammed selections. Alternatively, the system could use a two digit selection at this point in call processing which would provide a larger number of preprogrammed selections.

The ISCP uses the extra dialed digit representing a preprogrammed selection to access the calling customer's data file and identify one information service provider. Processing then proceeds to A in FIG. 5B. The ISCP checks the data file for the particular information service provider identified by the one extra dialed digit and determines if this provider operates information sources accessed through more than one destination number.

If the particular service provider uses only one access number, the ISCP formulates an instruction message including the destination number of that information service provider and sends that message to the SSP via the STP's. The SSP type office then routes the call using the destination number received in the instruction message.

Alternatively, the information service provider may operate different information sources, for different types of information (e.g. voice, data, video or multimedia), which a caller accesses via different incoming telephone lines each assigned a different destination telephone number. If such is the case, the ISCP next accesses the caller's data file to determine if the caller has preprogrammed one of the destination information sources for the identified service provider. If the customer has programmed a destination for this information service provider, the ISCP retrieves the destination number from the caller's data file. The ISCP then formulates an instruction message including the destination number and sends that message to the SSP via the STP's. The SSP type office then routes the call using the destination number received in the instruction message.

In either the situation where the information service provider uses only a single destination number or the caller preprogrammed a single source offered by this provider, the preprogrammed caller has dialed only four digits. Such a caller dialed 211, heard a tone or speech message, dialed a single selection digit, and the system used prestored data from the ISCP to determine the actual destination telephone number. Although the actual number may be seven digits, ten digits, fifteen digits or more, the caller never had to know or dial all of those digits. For example, if the service is this caller's #1 preprogrammed service, the caller dialed 211, heard an announcement, dialed 1, and the ISCP provided the destination number, such as the number 703-987-6543 used in an earlier example.

If the preprogrammed caller's data file does not indicate a programmed selection of one of the identified information service provider's destination sources, the ISCP must obtain a further selection from the caller identifying one information source as the call destination. The ISCP therefore sends another TCAP "INVOKE" message instructing the originating SSP to provide a further announcement to the caller and collect digits. This announcement could also be in the form of a subsequent dial tone or synthesized speech message and serves to ask the caller to enter a specified number of additional digits identifying a particular information service destination for the current information service provider (ISP).

The SSP sends the announcement to the caller, collects the specified number of additional digits and sends a message including those digits back to the ISCP via the STP's. Using these latest collected digits, the ISCP accesses a data file for the identified information service provider and retrieves the corresponding destination number. The ISCP then formulates an instruction message including the destination number of the selected source for this information service provider and sends that message to the SSP via the STP's. The SSP type office then routes the call using the destination number received in the instruction message.

Returning to FIG. 5A, if when the ISCP analyzed the first extra dialed digit the ISCP determined that the caller had requested menu type call processing, the ISCP now retrieves the menu. If the announcement platform providing the messages has sufficient capacity, the menu program could be customized by each customer, and the ISCP would retrieve the menu form a portion of the preprogrammed caller's data file. If the message capacity of the announcement platform is restricted, the menu would be standardized and the ISCP would retrieve the menu from some common point in its data base system. The ISCP sends another TCAP "INVOKE" message instructing the originating SSP to provide a further announcement to the caller and collect digits. This announcement, which would include the complete list of menu options, would be in the form of a synthesized speech message. Typically, the menu would correspond to the customer's available preprogrammed service provider selections, and the menu announcement would read the options and corresponding single digit selection numbers to the customer. The selection numbering would be the same as that used by the preprogrammed caller without the menu, but listening to the menu announcement allows the caller to select an information service provider without previously writing down or memorizing the list of preprogrammed selections.

At this point the caller again dials a single digit which the SSP collects. The originating SSP type central office sends a message to the ISCP via the STP(s) including the latest collected digit. The ISCP analyzes the dialed digit and the calling line identification data from the original TCAP query message to determine which preselected information service provider the caller has selected for purposes of the current call. Processing then flows to A in FIG. 5B and proceeds from that point, as described above.

In each of the announcement and digit collection steps in the call processing routine discussed above, the SSP would connect a DTMF tone detector to the caller's line while the SSP transmits the announcement to the caller: The caller therefore can input the next digit or set of digits during the announcement if the caller knows what number to dial at that point in the call processing routine. The experienced caller therefore need not always wait to hear the entire content of each announcement.

The above call processing methodology is just one example of a routine permitting access to information service providers using a single access code. Other call processing routines can provide access using the single code. For example, in one alternative, customers having preprogrammed selections would dial 211 and then 2# or 23#, in a manner similar to speed calling, to indicate that they want a preprogrammed information service provider. The # sign would signify an end of digit dialing so that the switch and the AIN would know that no more digits will follow. After receiving the # signal, the switch would send a message including the dialed digits to the ISCP; and the ISCP would access the data base to retrieve a preprogrammed selection from the calling customer's stored data. Casual users would dial "211" plus the number of digits necessary to reach a particular ISP, e.g., four additional digits. The ISCP would use the four digits to determine the desired ISCP from an ISCP table. This method eliminates the need for digits such as 0, 8 and 9 to have a particular meaning. Also, it is possible to use a full 10,000 numbers to identify the information service providers after dialing the single N11 code whereas a dialing plan using a 211+9XXX for casual access would allow only 1,000 information service providers.

Call Processing Using Two Access Codes

Figure 6:
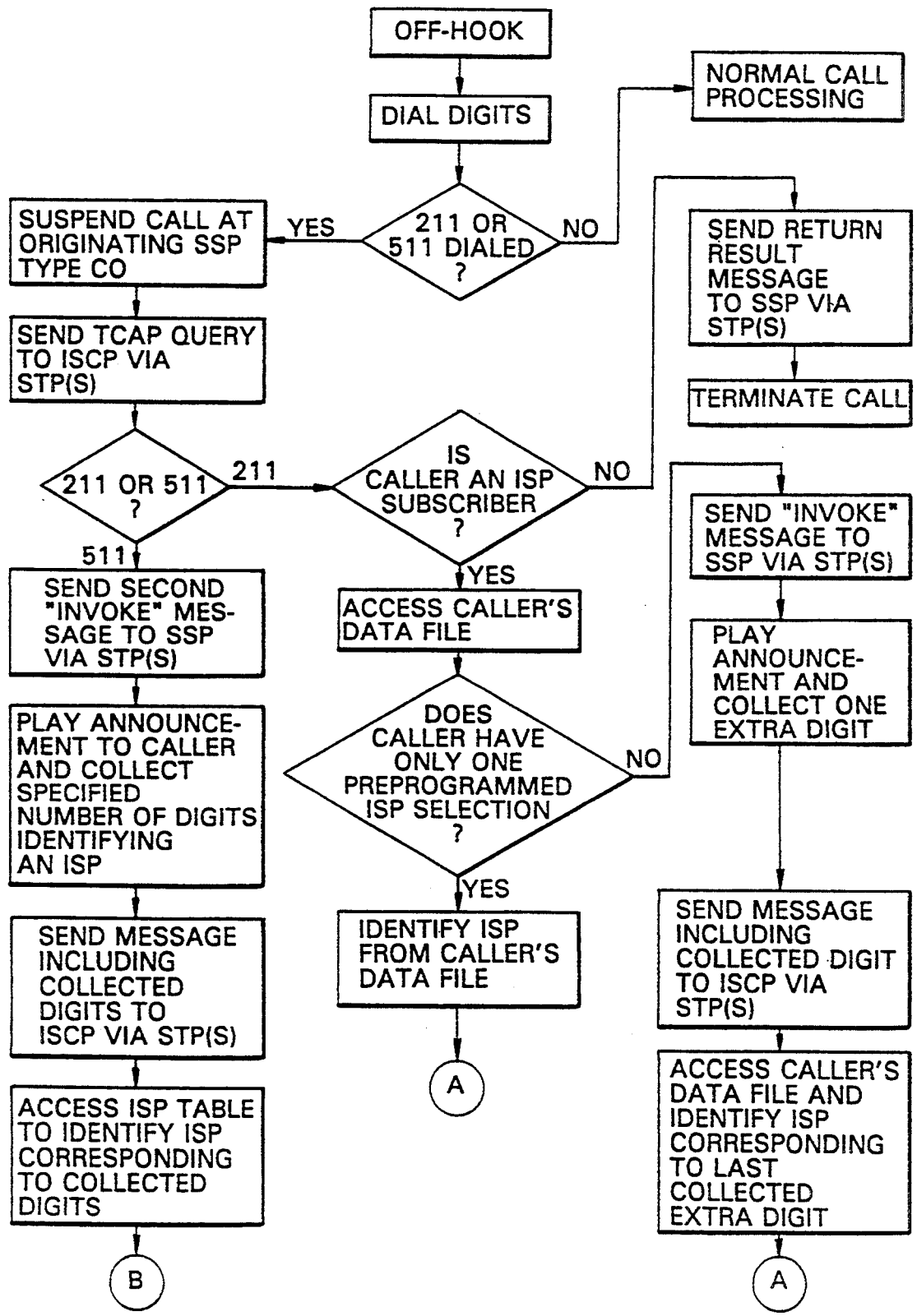
FIG. 6 is a flow chart showing the call processing routine, which would be substituted for that of FIG. 5A, for providing access via a first short access code for preprogrammed access and a second short access code for casual calling type access.

As an alternative to the above call processing, the invention could be implemented using two dedicated numbers as prescribed access codes. If two N11 type numbers are available, for example 211 and 511, one number identifies a request for access using preprogrammed service selections. The second access code would then be used for casual calls, either by preprogrammed or non-preprogrammed customers. FIG. 6 illustrates the call processing routine which would be substituted for that portion of the above discussed call processing routine illustrated in FIG. 5A.

To initiate any call, a telephone user takes the telephone handset off hook and dials digits. As shown in FIG. 6, the central office examines the first three digits to determine whether or not the customer has dialed one of the two dedicated information service access numbers. In the example used here, the numbers are each a different N11 type three digit number, specifically 211 and 511. Other N11 numbers or other specific numbers of fewer or more digits could be used, so long as the system recognizes an initial dialing of those digits as a request to access an information service provider.

Assuming that the system uses the 211 and 511 numbers as the access codes, if the caller has not dialed either of those numbers as the first three digits, the system executes its normal call processing routines. In a typical case this involves collecting seven or ten digits to identify a local or long distance call destination and completing the call to the dialed destination.

If the first three dialed digits were 211 or 511, the system processes the call as an information service call. The originating SSP type central office (CO) suspends the call and sends a query to the ISCP via one or more STP's. This query message is in the above described TCAP format for an initial query from an SSP. The query message includes the dialed digits either in three digit form or padded to form a seven digit number. The TCAP query also includes the identification of the telephone line from which the party originated the present call. The originating SSP sends the TCAP query via a dedicated CCIS link to an STP. The STP recognizes that the query is addressed to the ISCP and retransmits the query, either directly or through a further STP, and through the packet switched network as in FIG. 1, to the ISCP.

The ISCP determines if the dialed number in the TCAP message indicates that the caller initially dialed 211 or dialed 511. If the number dialed was 511, the system processes the call as a casual information service call, whether the call comes from a non-preprogrammed customer or from a customer who now wishes to casually call an information service provider not included in the preprogrammed selections for that customer. The call processing for such casual calls using 511 will be discussed in detail later.

If the number dialed was 211, the system processes the call as an information service call requesting processing using customer selection data programmed into the ISCP data base. The ISCP first checks the identification of the telephone line from which the party originated the present call. If the line does not correspond to a recognized customer, the ISCP sends a return result message to the SSP via the STP's. The SSP responds to this message by terminating the call.

If the line does correspond to a recognized customer, the ISCP accesses that preprogrammed caller's data file. The ISCP analyzes the caller's data file to determine if this preprogrammed caller has only one preprogrammed selection of an information service provider. If there is only one preprogrammed selection, the ISCP identifies the provider (ISP) from the caller's data file. Processing then proceeds to A in FIG. 5B. The ISCP checks the data file for the particular information service provider identified by the digits and determines if this provider operates information sources accessed through more than one destination number.

If the particular service provider uses only one access number, the ISCP formulates an instruction message including the destination number of that information service provider and sends that message to the SSP via the STP's. The SSP type office then routes the call using the destination number received in the instruction message. If the provider offers more than one service, using more than one destination number, the ISCP next accesses the caller's data file to determine if the caller has preprogrammed one of the destination information sources for the identified service provider. If the customer has preprogrammed a destination for this information service provider, the ISCP retrieves the destination number from the caller's data file. The ISCP then formulates an instruction message including the destination number and sends that message to the SSP via the STP's. The SSP type office then routes the call using the destination number received in the instruction message.

The above discussion highlights an important advantage of the call processing routine using a second number for casual calls. If the caller is preprogrammed to only one provider, and either that provider offers only one service or the caller has preprogrammed only one service from the provider, the system routes the call through based entirely on preprogrammed data. In such cases the system does not play an announcement of any type or ask for any further digit inputs. The ISCP provides the destination number, in our example a ten digit number such as 703-987-6543 from the caller's data file, without the caller dialing that number or any other digits except 211. To the calling customer it looks as if the system routed the call entirely in response to only the initial dialing of the 211 code.

Alternatively, at the step where the ISCP checks the caller's data file to determine if the preprogrammed caller's data file indicates a programmed selection of one of the identified information service provider's destination sources (FIG. 5A), the ISCP may find that the caller has not specified one destination only. The ISCP therefore must obtain a further selection from the caller identifying one information source as the call destination. The ISCP now sends a TCAP "INVOKE" message instructing the originating SSP to provide an announcement to the caller and to collect digits. This announcement could also be in the form of a subsequent dial tone or synthesized speech message and serves to ask the caller to enter a specified number of additional digits identifying a particular information service destination for the current information service provider (ISP).

The SSP sends the announcement to the caller, collects the specified number of additional digits and sends a message including those digits back to the ISCP via the STP's. Using these latest collected digits, the ISCP accesses a data file for the identified information service provider and retrieves the corresponding destination number. The ISCP then formulates an instruction message including the destination number of the selected source for this information service provider and sends that message to the SSP via the STP's. The SSP type office then routes the call using the destination number received in the instruction message.

Returning to FIG. 6, at the point where the ISCP checks the number of stored selections in the caller's data file, the ISCP may find that the caller has preprogrammed to more than one information service provider. The ISCP sends a TCAP "INVOKE" message instructing the originating SSP to provide a further announcement to the caller and collect digits. This announcement could include a complete list of menu options in the form of a synthesized speech message. Alternatively, the message at this point could be a tone message, but the system would allow the caller to select a menu option to proceed through another query and response operation including playback of a complete synthesized speech menu, similar to that of FIG. 5A but not shown in FIG. 6.

At the time of the announcement requesting selection of an information service provider, the caller dials a single digit which the SSP collects. The originating SSP type central office sends a message to the ISCP via the STP(s) including the latest collected digit. The ISCP analyzes the dialed digit and the calling line identification data from the original TCAP query message to determine which of several preprogrammed information providers the caller has selected for purposes of the current call. Processing then flows to A in FIG. 5B and proceeds from that point, as described above.

Now suppose that the caller dialed 511 to provide casual access to an information service provider. Thus in the routine of FIG. 6, at the point where the ISCP first examined the dialed digits, the ISCP finds that the caller dialed 511 instead of 211. The ISCP sends a TCAP "INVOKE" message instructing the originating SSP to provide another announcement to the caller and collect digits. This announcement could also be in the form of a subsequent dial tone or synthesized speech message. The announcement serves to ask the caller to enter a specified number of additional digits identifying a particular Information Service Provider (ISP). In a preferred embodiment, each provider might have an assigned three or four digit identification code which the provider would advertise in advertisements for the provider's services. The casual caller therefore would dial a selected provider's three or four digit identifier at this point. The system could use shorter or longer strings of digits to identify providers, depending on how many different information service providers the system should route calls to.

The originating central office SSP now collects the specified number of dialed digits for uniquely identifying one of the information service providers and sends a subsequent message to the ISCP via the STP(s) including the collected digits. The ISCP uses these latest collected digits to access an ISP table listing all of the information service providers and thereby identifies which Information Service Provider (ISP) the caller selected. Processing then proceeds to B in FIG. 5B. The ISCP checks the data file for the particular information service provider identified by the digits and determines if this provider operates information sources accessed through more than one destination number.

If the particular service provider uses only one access number, the ISCP formulates an instruction message including the destination number of that information service provider and sends that message to the SSP via the STP's. The SSP type office then routes the call using the destination number received in the instruction message.

Alternatively, if the information service provider operates different information sources, accessed using a number of different destination telephone numbers, then the ISCP still needs additional selection information in order to determine how to complete the present call. The ISCP therefore sends another TCAP "INVOKE" message to the SSP via the STP(s). This message instructs the originating SSP to provide a further announcement to the caller and collect digits. This announcement could also be in the form of a subsequent dial tone or synthesized speech message and serves to ask the caller to enter a specified number of additional digits identifying a particular information service destination for the current information service provider (ISP).

The SSP sends the announcement to the caller, collects the specified number of additional digits and sends a message including those digits back to the ISCP via the STP's. Using these latest collected digits, the ISCP accesses a data file for the identified information service provider and retrieves the corresponding destination number. The ISCP then formulates an instruction message including the destination number of the selected source for this information service provider and sends that message to the SSP via the STP's. The SSP type office then routes the call using the destination number received in the instruction message.

Possible Modification of Call Processing Routines

The call processing routines discussed above relate to the system of FIG. 1 wherein SSP type central office switches include the announcement platforms which provide all of the announcements. For the system of FIG. 2, any INVOKE messages which should produce a speech announcement would be replaced with an instruction to Send to a Resource, the peripheral announcement platform, and collect the appropriate digits. The ISCP would send messages directly to the peripheral announcement platform to identify the particular message for output to the SSP at any given time. The peripheral announcement platform approach allows customizing the messages provided, either by programming in the ISCP or programming the processor of the peripheral announcement platform. For example, if the peripheral announcement platform includes a text to speech converter, the ISCP would store customized announcements in text data form specified by customers and/or information service providers. The ISCP would then send text messages to the peripheral announcement platform for conversion to speech and output to the caller. This could be particularly useful in providing callers with customized menu announcements reflecting their personal preprogrammed information service providers and/or services offered by individual providers.

The network architecture of FIG. 3 would use processing similar to that shown in FIGS. 5A and 5B except that if the SSP type capability resides in the tandem, the tandem would launch the messages to the ISCP and would receive back the instruction and INVOKE messages from the ISCP. Also, in the system of FIG. 3, an announcement peripheral could be added to the tandem, in which case the messages back to the tandem would include the Send to Resource message, in place of one or more of the INVOKE messages shown in the flow charts. The system of FIG. 4 would use Send to Resource commands identifying the SCN and the SCN would perform data analysis and control routing through the SSP.

Access Authorization

The present system can also provide a variety of access authorization control features, for example requiring the caller to input a personal identification number (PIN) to complete the call.

For any of the above discussed information service calls, at any one or more of several different points in the call processing routine, the network would suspend call processing and send a query to the ISCP in the usual manner. The ISCP retrieves data for the customer corresponding to the originating line and/or data relating to procedures for accessing information sources or providers. The ISCP at this point checks the retrieved data and determines whether or not an access authorization procedure is required. If the retrieved data indicates that no access authorization is required for the present call, the system processes the call in the manner discussed above.

If instead the retrieved information indicates that access authorization is required for the specific service now requested, the ISCP sends a TCAP "INVOKE" message. The INVOKE message instructs the originating central office to provide an announcement to the user. This announcement could be in the form of a subsequent dial tone or synthesized speech and would ask the caller for an access authorization code, e.g., the caller's PIN. The INVOKE message also instructs the originating central office to subsequently collect the number of digits needed for the authorization code. The central office collects digits, for example DTMF dialed digits, and sends a subsequent query to the ISCP via the STP(s). The subsequent query includes the collected digits.

The ISCP checks the entered code against a list of valid codes. If the code is not valid, the ISCP sends a return result message instructing the CO to terminate the call. Although shown and described as a single query and check for a valid code, the data base could provide instructions to go back and repeat the request and code entry procedure allowing the user a specified number of attempts to enter a valid code before denying service. If the code digits match a valid code, the network resumes call processing and ultimately routes the call to the appropriate destination as described above.

The above described access authorization control, because of the use of programmed data stored in the SCP, can be easily adapted to a variety of access authorization control scenarios. The customer can preprogram in an access authorization procedure, either for all calls using the short code access of for all calls to certain types of information service providers or for calls to certain sources offered by specific providers. Also, the information service providers preprogram the ISCP data files to require an access authorization procedure and determine which incoming calls require such screening. The only difference in the authorization procedure is precisely where in the call processing routine the system performs the above described access authorization procedure. To illustrate this point, we will discuss several possible scenarios.

In a first example, assume that a customer has requested an access authorization procedure for all information service calls from the customer's home telephone line. The ISCP, after receiving the initial TCAP query with dialed digits and ANI identifying the calling line would access the data file for the calling line and realize that the customer requested the authorization procedure. The system would then execute the announcement and digit collection procedure to determine if the current caller knows the access code and is therefore authorized to make an information service call from that line. This allows the customer to limit who can make such calls from the home telephone line by simply not giving out the authorization code. In particular, families may want to prohibit children from using such services and running up excessive bills for such calls.

In a similar scenario, the customer might request execution of the access authorization procedure at some point just after the final destination has been identified. Certain identified providers and/or sources would indicate a need for access authorization and others would not, and the distinction could be based on the type of information provided by each. Parents for example, might want to allow calls to sports lines without use of an access authorization code but require use of the code for calls to dial-a-porn numbers.

Alternatively, the information service provider, knowing the sensitive nature of the information provided or the high charges which use of a particular service might incur, could specify that all calls directed to that provider or to a specific one of that provider's information services require access authorization. The authorization procedure would occur after the identification of the provider and possibly after identification of one of that providers services. This allows the provider extra control over access to sensitive materials.

The programmability of the SCP data base allows an almost unlimited variety of access authorization scenarios dependent on the desires of the customers and the information service providers.

Service Creation/Modification

Another advantage of the present system is the ability to write and modify the customer's stored data file at any time to suit the customer's current information service needs. In an initial implementation, the changes in the data base will probably be made manually by a telephone company technician. Specifically, a technician operating the ISCP would establish or enter changes in the customer's data files. The customer would ask the telephone operating company for a change, and the operating company would issue a service order to the technician for each change. The technician would then use the SCE terminal to actually enter the changes into the data base, and the telephone company would bill the customer for the change.

Customers, however, are increasingly asking for control over their own communication services. The present invention will provide such control by allowing the customer one of several forms of access to their data files in the ISCP.

A preferred implementation of such a service creation/modification feature would use another interactive voice and DTMF input type access procedure similar to those used to select individual providers and individual services, using synthesized speech prompts. The customer would dial a specified number to initiate programming, for example a seven digit number such as 550-0211. The call could be routed through the network to an appropriate automated voice response system coupled to the ISCP. Alternatively, the SSP connected to the line could interpret this dialed number as an AIN trigger and respond to instructions from the ISCP to provide voice messages from an associated peripheral announcement platform and forward dialed digits and ANI data to the ISCP as TCAP messages. In either case, if the customer calls from that customer's own line, the ANI information for the call serves to identify the customer. Alternately, the customer could enter an identification number. The ISCP would receive and use the ANI or dialed DTMF identification number to identify the customer's data files. The ISCP, however, would grant access only to the identified customer's files.

The voice response system would provide synthesized speech prompts and accept DTMF inputs to allow individual customers to enter their own changes in their data files in the ISCP. This interactive voice response type system would prompt the caller with messages directing the caller to select items from a menu of possible entries or changes in the customer's information service selection data file. For example, if the customer preprograms to one sports line service, the customer could call in and cancel the service or switch to a different service, etc. The menu items would only include entries which were compatible with the AIN system processing procedures, and entries would be stored in the data file only after they are determined to be complete and system compatible.

For a more sophisticated customer, access might be provided via a Personal Computer, a data terminal or some other form of work station. Such a customer would call in and establish a data link to the ISCP. Security is controlled through the terminal and/or the line from which the terminal calls in to the ISCP. The terminal may have a built in security code which the ISCP verifies before granting access to the data base, or the ISCP may check the originating telephone number and the terminal identity number against a stored number from which that terminal is expected to call. Once access was granted, however, the terminal would still only have access to an individual customer's files or the files of employees of a business customer. Other customer's files, and the programming which controls system operation, would not be available through such terminal access. As in the DTMF access system, the terminal access procedure would limit the customer's entries to complete entries which were compatible with the AIN system operating parameters. Alternatively, the terminal or workstation could be owned and operated by one or more of the information service providers. The service provider would sell services to individual customers, and then the provider would use the terminal to enter new service selections or enter changes in the customer's selected processing routines (e.g. menus) on behalf of that provider's individual customers.

The ISCP includes a validation system, which is an expert system prevents incompatible entries. For example, the validation system prevents entry of service changes which would create infinite loops that would cause the switch to malfunction. The validation system would control entry of new services and changes in service for each type of customer access to the ISCP data files.

The present invention thus provides access to a large number information sources in response to dialing of a short dedicated access code, such as an N11 telephone number. The system can use a single N11 number for all calls, or a first code number for preprogrammed call processing and a second number for casual access. The system routes information service calls based on preprogrammed selection data for the caller stored in a central data base, or on a combination of prestored selection data and interactive inputs from the caller. Alternatively, the system prompts a casual caller for various inputs to determine which service the caller currently wants to access.

The disclosed system of call routing eliminates the need for information service users to know a large number of different telephone numbers to access a variety of information services, without dedicating all available N11 codes to a corresponding limited number of information service providers. In the preferred embodiment, the user only needs to know a single three digit N11 type access number, such as 211 or 511.

The use of a programmable central data base also facilitates customizing of routing and call processing procedures for different customers and different provider's services. Furthermore, the system allows easy modification and updating of the stored data to suit a customer's current needs for accessing different information sources. Another advantage is that the system can provide access authorization procedures, as defined by the customer or as defined by the information service provider.

We claim:

1. A communication network, comprising:
   local communication lines;
   a plurality of separately located central office switching systems interconnected via trunk circuits for selectively providing switched call connections between at least two of the local communication lines;
   a services control point, separate from the central office switching systems, comprising a database storing call processing data associated with a plurality of the local communication lines for control of call processing through one or more of the central office switching systems;
   a first signalling communication system for two-way communications of data messages, said first signalling communication system interconnecting the central office switching systems and connecting the central office switching systems to the services control point;
   a peripheral platform connected to at least one of the central office switching systems via a call connection channel, said peripheral platform comprising means for providing at least one information service via the call connection channel; and
   a second signalling communication system, separate from the first signalling communication system and the central office switching systems, for providing two-way communications of data messages between the peripheral platform and the services control point to control provision of the at least one information service by the peripheral platform.

2. A communication network, comprising: local communication lines;
   a plurality of separately located central office switching systems interconnected via trunk circuits for selectively providing switched call connections between at least two of the local communication lines;
   a services control point, separate from the central office switching systems, comprising a database storing call processing data associated with a plurality of the local communication lines for control of call processing through one or more of the central office switching systems;
   at least two peripheral platforms, each of which connects to at least one of the central office switching systems via a call connection channel, each of said at least two peripheral platforms comprising means for providing an information service in response to instructions from said services control point; and
   a signalling communication system separate from said trunk circuits for two-way communications of data messages between the central office switching systems, between the central office switching systems and the services control point, between the at least two peripheral platforms and between the at least two peripheral platforms and the services control point.

3. A call processing method for a communication system having at least two switching offices, a plurality of communication lines connected thereto and a central control separate from the switching offices, said call processing method comprising the steps of:
   receiving a request for service via one of the communication lines;
   providing a call connection from said one of the communication lines to a peripheral platform, without obtaining instructions from said central control;
   communicating between said central control and said peripheral platform to identify an information service to be described by said peripheral platform in response to said request for service; and
   executing the identified information service via said call connection.

4. A call processing method for a communication system having at least two switching offices, a plurality of communication lines connected thereto and a central control separate from the switching offices, said call processing method comprising the steps of:
   during processing of a call from one of the communication lines, detecting a triggering event;
   if the triggering event is of a first predefined type, sending a query from one of the switching offices to the central control, transmitting call processing data from the database in the central control to the one switching office, and establishing a call connection from said one of the communication lines through at least the one switching office in response to the transmitted call processing data; and if the triggering event is of a second predefined type, providing a call connection from said one of the communication lines to a peripheral platform without obtaining instructions from said central control, communicating between said central control and said peripheral platform to identify an information service to be described by said peripheral platform, and executing the identified information service via the call connection to the peripheral platform.

* * * * *